(12) United States Patent
Nuseibeh et al.

(10) Patent No.: US 10,713,355 B2
(45) Date of Patent: Jul. 14, 2020

(54) METHOD AND SYSTEM FOR ADAPTIVE SECURITY IN CLOUD-BASED SERVICES

(71) Applicant: QATAR UNIVERSITY, Doha (QA)

(72) Inventors: Bashar Nuseibeh, London (GB);
Arosha Bandara, Northampton (GB);
Khaled M. Khan, Doha (QA); Niamul Haque Khan, Doha (QA); Armstrong Nhlabatsi, Hlathikhulu (SZ); Thein Than Tun, London (GB); Yijun Yu, Milton Keynes (GB)

(73) Assignee: QATAR UNIVERSITY, Doha (QA)

( * ) Notice: Subject to any disclaimer, the term of this patent is extended or adjusted under 35 U.S.C. 154(b) by 129 days.

(21) Appl. No.: 15/785,858

(22) Filed: Oct. 17, 2017

(65) Prior Publication Data
US 2018/0114015 A1    Apr. 26, 2018

Related U.S. Application Data

(60) Provisional application No. 62/411,445, filed on Oct. 21, 2016.

(51) Int. Cl.
*G06F 21/55*      (2013.01)
*H04L 29/06*      (2006.01)
(Continued)

(52) U.S. Cl.
CPC ............ *G06F 21/552* (2013.01); *G06F 21/31* (2013.01); *G06F 21/316* (2013.01); *H04L 63/107* (2013.01); *H04L 67/1095* (2013.01); *H04W 12/08* (2013.01); *G06F 2221/2111* (2013.01); *H04L 63/0876* (2013.01); *H04W 12/00503* (2019.01)

(58) Field of Classification Search
CPC ...... G06F 21/552; G06F 21/31; G06F 21/316; G06F 2221/2111; G06F 21/40; H04W 12/08; H04W 12/00503; H04L 63/1425; H04L 67/306; H04L 63/1441; H04L 63/102; H04L 63/107; H04L 63/1433; H04L 63/20; H04L 63/0876
See application file for complete search history.

(56) References Cited

U.S. PATENT DOCUMENTS 7,676,470 B2      3/2010 Arbajian
9,330,262 B2 *    5/2016 Salehie ............... G06F 21/50
(Continued)

FOREIGN PATENT DOCUMENTS

CN      102438047 A      5/2012

*Primary Examiner* — Theodore C Parsons
*Assistant Examiner* — Thomas Ho
(74) *Attorney, Agent, or Firm* — Squire Patton Boggs (US) LLP

(57) ABSTRACT

Certain embodiments may generally relate to controlling access to data held in the cloud. A method for controlling access to data held in the cloud may include determining, at a cloud server, the validity of user credentials received from a user device. The method may also include receiving context data related to the user device based on the validity of the user credentials. The method may further include synchronizing the context data with the cloud server. In addition, the method may include enforcing context-sensitive security checks on requests made by the user for resources based on the sensor data collected by the user device.

12 Claims, 15 Drawing Sheets

(51) Int. Cl.
*G06F 21/31* (2013.01)
*H04W 12/08* (2009.01)
*H04L 29/08* (2006.01)
*H04W 12/00* (2009.01)

(56) References Cited

U.S. PATENT DOCUMENTS

| | | | |
|---|---|---|---|
| 9,426,182 B1* | 8/2016 | Zeljko | H04L 63/20 |
| 2003/0191944 A1 | 10/2003 | Rothrock | |
| 2006/0120526 A1* | 6/2006 | Boucher | G06F 21/6218 380/247 |
| 2011/0126281 A1* | 5/2011 | Ben-Zvi | G06F 21/6218 726/21 |
| 2013/0174239 A1* | 7/2013 | Kim | H04L 63/205 726/7 |
| 2013/0305357 A1* | 11/2013 | Ayyagari | H04W 12/06 726/22 |
| 2013/0311737 A1* | 11/2013 | Shaw | G06F 21/305 711/163 |
| 2014/0090071 A1* | 3/2014 | Salehie | G06F 21/50 726/25 |
| 2014/0123296 A1* | 5/2014 | Subramanian | H04L 67/10 726/26 |
| 2014/0130142 A1* | 5/2014 | Plewnia | G06F 21/335 726/5 |
| 2014/0282857 A1* | 9/2014 | White | G01S 5/00 726/1 |
| 2014/0359272 A1* | 12/2014 | Hiltunen | G09C 1/00 713/150 |
| 2015/0074670 A1* | 3/2015 | Gerganov | G06F 9/5027 718/103 |
| 2015/0200958 A1* | 7/2015 | Muppidi | H04L 41/28 726/23 |
| 2016/0156661 A1* | 6/2016 | Nagaratnam | G06F 21/57 726/1 |
| 2017/0279813 A1* | 9/2017 | Vicente | G06F 21/6236 |

* cited by examiner

```xml
<Request xmlns="urn:oasis:names:tc:xacml:2.0:context:schema:os">
  <Subject>
    <Attribute AttributeId="Doctor" DataType="string">
      <AttributeValue>Bob</AttributeValue>
    </Attribute>
  </Subject>
  <Resource>
    <Attribute AttributeId="PatientRecord" DataType="string">
      <AttributeValue>Alice</AttributeValue>
    </Attribute>
  </Resource>
  <Action>
    <Attribute AttributeId="Read" DataType="string"/>
  </Action>
  <Environment/>
</Request>
```

Figure 5

```xml
<Policy PolicyId="DoctorReadPatientRecordPolicy"
    RuleCombiningAlgId="rule-combining-algorithm:permit-overrides">
  <Target>
    <Subjects><Subject>
    <SubjectMatch MatchId="string-equal">
      <AttributeValue DataType="string">Bob</AttributeValue>
      <SubjectAttributeDesignator AttributeId="Doctor"
          DataType="string"/>
        </SubjectMatch>
    </Subject></Subjects>
    <Resources><Resource>
      <ResourceMatch MatchId="string-equal">
    <AttributeValue DataType="string">Alice</AttributeValue>
    <ResourceAttributeDesignator AttributeId="PatientRecord"
        DataType="string"/>
  </ResourceMatch>
    </Resource></Resources>
    <Actions><Action>
    <ActionMatch MatchId="string-equal">
        <AttributeValue DataType="string">Read</AttributeValue>
      <ActionAttributeDesignator AttributeId="Read"
          DataType="string"/>
    </ActionMatch>
    </Action></Actions>
  </Target>
  <Rule RuleId="allowDoctorReadPatientRecord" Effect="Permit">
    <Condition><Apply FunctionId="and">
      <Apply FunctionId="boolean-equal">
        <EnvironmentAttributeDesignator origin="Aware"
            AttributeId="isGPSWithinHospital" DataType="boolean"/>
        <AttributeValue DataType="boolean">true</AttributeValue>
      </Apply>
      <Apply FunctionId="boolean-equal">
        <EnvironmentAttributeDesignator origin="Aware"
            AttributeId="isWorkingHour" DataType="boolean"/>
        <AttributeValue DataType="aware">true</AttributeValue>
      </Apply>
      </Condition>
  </Rule>
  <!-- otherwise -->
  <Rule RuleId="denyDoctorReadPatientRecord" Effect="Deny"/>
</Policy>
```

Figure 6

```
<Response> <Result>
<Decision>Deny<Decision>
<Status><StatusCode Value="ok"/><Status>
<Result> <Response>
```

Figure 7

```xml
<Aware name="isGPSWithinHospital">
    <Condition>
       <Apply FunctionId="and">
          <Apply FunctionId="integer-less-than-or-equal">
           <EnvironmentAttributeDesignator
              AttributeId="WorkingHour" DataType="integer"/>
           <AttributeValue  DataType="integer">17</AttributeValue>
          </Apply>
        <Apply FunctionId="integer-greater-than-or-equal">
         <EnvironmentAttributeDesignator
              AttributeId="WorkingHour" DataType="double"/>
          <AttributeValue  DataType="integer">9</AttributeValue>
        </Apply>
    </Condition>
</Aware>
<Aware name="isWorkingHour">
    <Condition>
        <Apply FunctionId="and">
          <Apply FunctionId="double-less-than">
          <EnvironmentAttributeDesignator
               AttributeId="Latitude" DataType="double"/>
            <AttributeValue  DataType="double">25.282</AttributeValue>

</Apply>
          <Apply FunctionId="double-greater-than">
          <EnvironmentAttributeDesignator
               AttributeId="Latitude" DataType="double"/>
            <AttributeValue  DataType="double">25.292</AttributeValue>
          </Apply>
          <Apply FunctionId="double-less-than">
          <EnvironmentAttributeDesignator
               AttributeId="Longitude" DataType="double"/>
            <AttributeValue  DataType="double">51.525</AttributeValue>
          </Apply>
          <Apply FunctionId="double-greater-than">
          <EnvironmentAttributeDesignator
               AttributeId="Longitude" DataType="double"/>
            <AttributeValue  DataType="double">51.535</AttributeValue>
          </Apply>
        </Apply>
    </Condition>
</Aware>
```

Figure 8

METHOD AND SYSTEM FOR ADAPTIVE SECURITY IN CLOUD-BASED SERVICES

CROSS REFERENCE TO RELATED APPLICATION

This application claims priority to U.S. Provisional Application No. 62/411,445 filed on Oct. 21, 2016. The entire contents of the above-referenced provisional application is hereby incorporated by reference in its entirety.

FIELD OF THE INVENTION

Certain embodiments may generally relate to controlling access to data held in the cloud. More specifically, certain embodiments of the present invention generally relate to controlling access to data held in the cloud using context information pertaining to a user's accessing mobile device.

BACKGROUND OF THE INVENTION

File storage is one of the most popular use cases for cloud computing. A cloud-based file sharing service may generally adopt an open-source development model, providing a universal way to access shared files through any Web browser from desktop or mobile devices.

The access control mechanism implemented in a current cloud-based server may use database queries to determine whether an end-user is allowed to create, read, update, delete, or share a document to other users. It may also assume that the access control decisions are based on properties similar to those of a desktop file system. However, in a mobile world where people in different environments have access to different documents, such access control decisions need to take into account richer and changing contextual situations that cannot be predetermined only by the content and user permissions of intended files.

Existing context-aware access control proposals demonstrate the need to support rich context-aware access control requirements for mobile end-users, but they have not yet been applied to cloud-based services. In order to develop a systematic method for integrating a context-aware access control system to a cloud-based application, it is desired to reengineer current cloud servers to replace discretionary access control mechanisms with a more expressive attribute-based access control system.

Further, the Extensible Access Control Markup Language (XACML) is a standard for defining the language for decoratively specifying dynamic access control policies as well as the process to enforce such policies. According to the standard, a policy-based process for access control may provide both Policy Decision Points (PDP) and Policy Administration Points (PAP). The PAP supports the interfaces needed to set up the root policy as a predefined set of rules, while the PDP evaluates the policies that apply to a given access request in order to make the access control decisions.

Additionally, there are many cloud-based services that are accessed by their users using diverse mobile devices. Security mechanisms in those services are usually related to authentication and authorization. Increasingly contextual information from the user devices provides a rich source of information for enhancing security of those services. Enabling context-awareness in security mechanisms of existing cloud-services is a difficult engineering challenge because it is not clear how applications should sense the user context, and how the sensed data should be used.

There is a need, therefore for both policy decision and administration points to be context-aware in order to allow different decisions by policy rules to reflect the context-of-use of the system for which access control is required. Due to the wide adoption of mobile devices, such contextual situations are no longer based on the consent of files. Instead, they need to take into account the values of a range of variables sensed by the devices.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

SUMMARY OF THE INVENTION

Embodiments of the present invention overcome the above-mentioned and other drawbacks by providing methods and system for using contextual parameters to make access-control policy decisions that reflect the context-of-use of the system for which access control is required.

According to a first embodiment, a method for controlling access to data held in the cloud may include determining, at a cloud server, the validity of user credentials received from a user device. The method may also include receiving context data related to the user device based on the validity of the user credentials. The method may further include synchronizing the context data with the cloud server. In addition, the method may include enforcing context-sensitive security checks on requests made by a user for resources based on the sensor data collected by the user device.

In the method of the first embodiment, the context data may include data about a state of a physical world outside of the user device, and the context data may include data about a state of the user device itself. Further, the context data about the state of the physical world outside of the user device may include a user identity, a global positioning system location of the user device, and an accelerometer reading. In addition, the context data about the state of the user device itself may include applications running on the user device at a given time, a battery level of the user device, and screen brightness of the user device.

In the method of the first embodiment, access to the resources may be subject to one or more preconditions related to the context data. The method may also include determining if the requests for resources are compliant with access control policies of the cloud server in addition to enforcing the context-sensitive security checks. Further, the context-sensitive security checks may vary based on a sensitivity level of the resources.

According to a second embodiment, a cloud server for controlling access to data held in the cloud may include at least one processor, and at least one memory including computer program code. The at least one memory and the computer program code may be configured to, with the at least one processor, cause the apparatus at least to determine, at a cloud server, the validity of user credentials received from a user device, receive context data related to the user device based on the validity of the user credentials, synchronize the context data with the cloud server, enforce context-sensitive security checks on requests made by a user for resources based on the sensor data collected by the user device.

In the apparatus of the second embodiment, the context data may include data about a state of a physical world outside of the user device, and the context data comprises data about a state of the user device itself. Further, the context data about the state of the physical world outside of the user device may include a user identity, a global positioning system location of the user device, and an accelerometer reading. In addition, the context data about the state of the user device itself may include applications running on the user device at a given time, a battery level of the user device, and screen brightness of the user device.

In the apparatus of the second embodiment, access to the resources may be subject to one or more preconditions related to the context data. Further, the at least one memory and the computer program code may further be configured to, with the at least one processor, cause the apparatus at least to determine if the requests for resources are compliant with access control policies of the cloud server in addition to enforcing the context-sensitive security checks. In addition, the context-sensitive security checks may vary based on a sensitivity level of the resources.

According to a third embodiment, there may be provided a computer program, embodied on a non-transitory computer readable medium that when executed by a processor, causes the processor to determine, at a cloud server, the validity of user credentials received from a user device, receive context data related to the user device based on the validity of the user credentials, synchronize the context data with the cloud server, and enforce context-sensitive security checks on requests made by a user for resources based on the sensor data collected by the user device. According to the computer program of the third embodiment, the context data may include data about a state of a physical world outside of the user device, and the context data may include data about a state of the user device itself. Further, the context data about the state of the physical world outside of the user device may include a user identity, a global positioning system location of the user device, and an accelerometer reading. In addition, the context data about the state of the user device itself may include applications running on the user device at a given time, a battery level of the user device, and screen brightness of the user device.

In the computer program of the third embodiment, access to the resources may be subject to one or more preconditions related to the context data. Further, the computer program, when executed by the processor, may further cause the processor to determine if the requests for resources are compliant with access control policies of the cloud server in addition to enforcing the context-sensitive security checks. In addition, the context-sensitive security checks varies based on a sensitivity level of the resources.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 5 illustrates an exemplary policy according to certain embodiments.

FIG. 6 illustrates another exemplary policy according to certain embodiments.

FIG. 7 illustrates a further exemplary policy according to certain embodiments.

FIG. 8 illustrates yet another exemplary policy according to certain embodiments.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION OF THE INVENTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Certain embodiments described herein may make use of the following three open-source software tools. These tools may be available under the Apache Software License 2.0. One tool may include Android Mobile Context Instrumentation Framework (AWARE). Another tool may include eXtensible Access Control Markup Language Light (XACMLight) Engine as a web service supporting the creation and management of XACML access control policies. A third tool may include Apache Axis2 server as a software tool for creating and hosting web services.

The Adaptive Information Security (AIS) Architecture is a computer-implemented method and system of hardware and software components for achieving adaptive security in cloud-based web-services. The AIS architecture may include a computer-implemented method that (i) monitors the user context by non-intrusively collecting sensor data on the client device, (ii) securely synchronizes the collected sensor data to the sever which may be on a machine separate from the cloud server, and (iii) enforces context-sensitive security checks on the user's requests for resources based on the collected sensor data. These computer-implemented security checks may be additions to the enforcement of rule-based access control policies of the server. According to certain embodiments, the method may be used to create a system of adaptive security in a cloud-based document sharing system.

Figure 1:
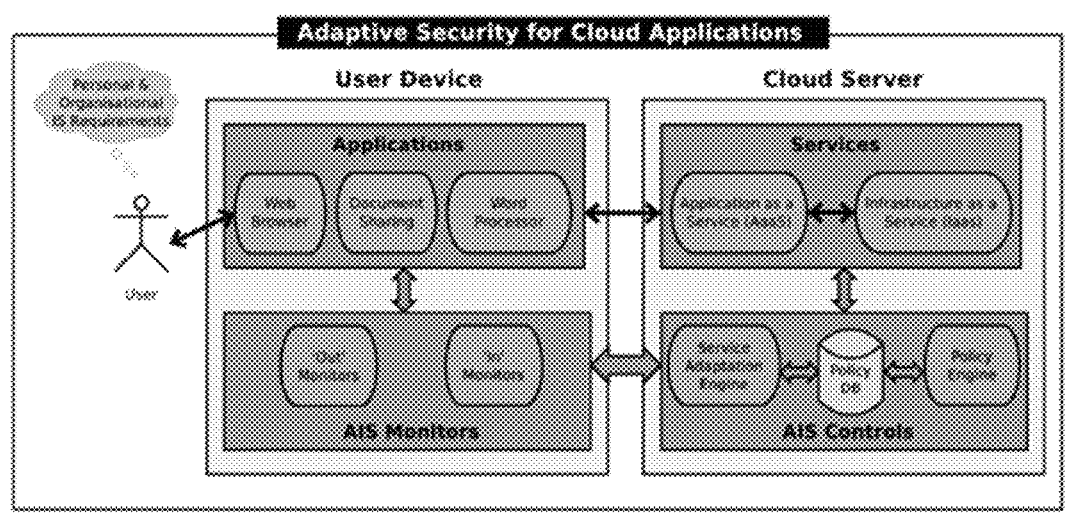
FIG. 1 illustrates a system design of hardware and software components according to certain embodiments.

Referring to FIG. 1, there is shown a system design of hardware and software components, according to certain embodiments, where adaptive security may be achieved by dividing the responsibilities between the components on the client and the server sides. User Device and Cloud Server are the two hardware components. Services, provided by the Cloud Server, may be accessed by users using User Devices, such as smart phones and tablets, or any other similar type devices. Services may represent a stack of services such as Application-as-a-Service (AaaS) and Infrastructure-as-a-Service (IaaS). The Applications box inside User Device may represent the client software used to access cloud services, while the Services box inside Cloud Server may represent the stack of cloud services such as AaaS and IaaS. These two boxes by themselves may constitute typical cloud applications with no adaptive information security capabilities.

According to certain embodiments, the AIS architecture may integrate two sets of additional components, including, for example, AIS Monitors and AIS Controls, in order to make cloud applications adaptive to changing security context. In this architecture, adaptation may be driven by the user and organizational requirements for information security, and the user context.

In certain embodiments, the user may interact with applications, and the two components in AIS Monitors to collect data about the state of the physical world outside of the device via the device sensors ('Out' Monitors), and data about the state of the device itself ('In' Monitors). The former may include the user identity, the global positioning system (GPS) location of the device, and accelerometer readings, while the latter may include the applications running at a given time, battery level of the device, and/or screen brightness. The frequency at which the information is collected may also depend on the device capacities and the organizational information security goals.

In other embodiments, the data collected by AIS Monitors may be sent to the server, which may be on a different hardware component. Further, the Service Adaptation Engine may use the data collected by AIS Monitors in order to determine the user context. This may be performed via statistical machine learning techniques such as, for example, naive Bayes and logistic regression approaches to classification. In addition, whenever the server receives a request for resource such as a file, the Service Adaptation Engine may enforce additional security constraints on the basis of the inferred user context.

Figure 2:
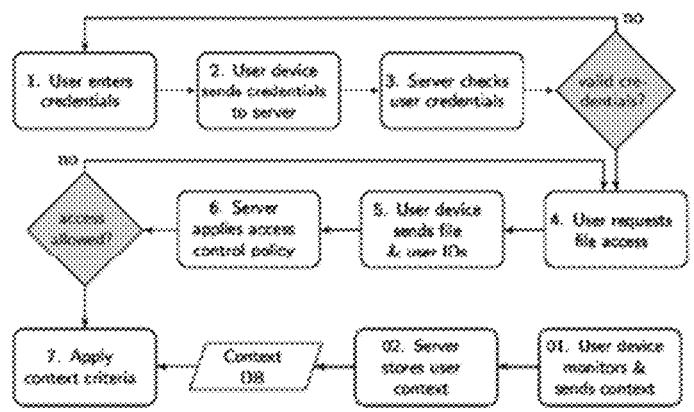
FIG. 2 illustrates a flow diagram according to certain embodiments.

Referring to FIG. 2, there is shown a flow diagram according to certain embodiments, which shows a computer implemented method for achieving adaptive security in cloud services using the AIS architecture. Steps 1-6 in FIG. 2 may represent a traditional method for authenticating users and enforcing rule-based access control policies on requests on file access. In particular, at step 1, the user may enter user credentials. At step 2, the user device may send the user credentials to the server, and in step 3, the server may check and/or verify the user credentials. A determination is then made by the server as to whether or not the credentials received are valid. If it is determined that the credentials are not valid, then the method returns to step 1. If it is determined that the credentials are valid, then at step 4, the user may request file access.

At step 5, the user device may send the file and user identification (IDs) to the server, and at step 6, the server may apply the access control policy. Then, at step 7, the server may determine if access to the requested file is allowed. If it is determined that access is not allowed, then the method returns to step 4. If it is determined that access is allowed, then at step 7, a certain context criteria may be applied. In particular, the AIS architecture may, at step 01, continuously monitor the user context and send the context. The AIS Architecture may also, at step 02, store the context information on the server, and then send the context.

Figure 3:
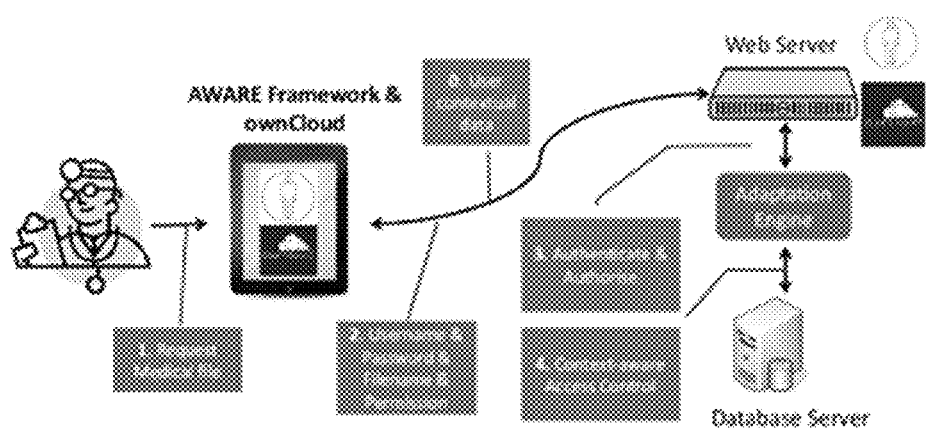
FIG. 3 illustrates an implementation of an AIS architecture according to certain embodiments.

Referring to FIG. 3, there is shown a flow diagram of an implementation of the AIS architecture according to certain embodiments. In particular, FIG. 3 shows an implementation of the AIS architecture with a realistic scenario example from a medical information systems domain. For example, as shown in FIG. 3, it may be assumed that a doctor wishes to access a patient record file using a mobile device. As shown in steps 1-3 and 0 of FIG. 3 for example, the doctor may normally have to provide user credentials together with the details of the file that the doctor wishes to access. If the authentication succeeds and if the request satisfies the organizational policy on access control, the doctor may be given the privilege and access to the resource as requested. As further shown step 4 of FIG. 3, with the AIS architecture, the adaptation engine may perform additional security checks by considering the user context. If, for example, the doctor is not using the office computer provided by the hospital, the access request will be denied even through the doctor has provided valid credentials and even though the access control policy allows the requested access.

A more detailed description of the implementation of the AIS architecture with respect to the medical information systems domain as an example is further provided below. Certain embodiments, however, may not be so limited to the medical information systems domain and may be applicable to other domains and/or cloud systems.

Context-Aware Policy Decision Point (PDP) Requirements

In one implementation according to certain embodiments, for example, and continuing with the above example, a hospital may be using a cloud system as a cloud-based Web service for keeping electronic health records of the patients. The doctor may have access to records of patients registered under his clinic. Using a laptop registered with the hospital, the doctor may try to make changes to a patient's record stored in the cloud system. After checking the patient's symptoms, the doctor may wish to prescribe medicine using his personal tablet or wireless device through the Web interface of the cloud system. According to the existing implementation of the cloud server's access control, the doctor's action is permitted because the access control policies are static, meaning the devices used to gain access do not matter. This could be a serious problem in some circumstances. For example, if the doctor left his tablet in a public area unattended, the sensitive prescription information of the patient could be available to those who found the tablet. It is therefore necessary to tighten the access control policies so that mobile devices can only be used at times and from places where the system can be sure that the security of the sensitive information will be maintained.

In above scenario, ideally the doctor should not be able to access all the files using any device in any circumstance. The access control should be context-aware, that is, according to certain embodiments, the access control should be adaptive to the context of use. When someone attempts to access the prescription file using the doctor's tablet, access may be denied when the tablet is not within the doctor's work environment.

According to certain embodiments, there may be several preconditions relating to the context before access is permitted. These preconditions may include, but not limited to, for example: the tablet needs to be registered in the hospital network which is currently using the encrypted hospital WiFi SSID; access happens within the office working hours; and the location of access is within the hospital boundaries. Additionally, in other embodiments, files containing less sensitive information may not have such restrictions.

According to certain embodiments, context-aware policy decision requirements may be formalized as in the following manner. For example, for access control policy decision requirements, a policy decision may be required for a set of resources R to give a set of users U a set of access permissions P, denoted by the predicate access:

$$\text{access}(R,U,P) \tag{R1}$$

For example, the doctor may always have read or write permissions on the patient's record, but is not allowed to share it with anyone else, here:

$$\text{access}(\text{PatientRecord},\text{Doctor},\{\text{Read},\text{Write}\}) \tag{1}$$

Using role-based access control policies, the above rule may be generalized to a group of users and a group of resources, for example, as follows:

$$\text{access}(\text{PatientRecord},\text{Doctor},\{\text{Read},\text{Write}\}) \tag{2}$$

In a context-aware access control policy decision requirement, a context-aware policy decision may be required to give a set of user(s) U, a set of permissions P to access a set of resource(s) R, when the set of contextual attributes A satisfy a Boolean condition $C(A)$, denoted by $C(A) \rightarrow \text{access}(R, U, P)$, or the following:

$$\text{access}(R,U,P)|C(A) \tag{R2}$$

With the above example, the doctor may get both Read and Write access to the records only when he or she is in the hospital, within working hours between 9 AM and 5 PM, denoted by the following:

$$\text{access}(\text{PatientRecord},\text{Doctor},\{\text{Read},\text{Write}\}) \\ \text{GPSLocation=Hospital} \land 9 \le \text{WorkingHour} \le 17 \tag{3}$$

Here, GPS location and working hour are two variables introduced to differentiate the varying contextual situations. To fully cover all possible situations, a single context-aware policy decision requirement may not be sufficient. In particular, it may be necessary to specify the permissions for a collection of situation other than this one, and also indicate the default (otherwise) permissions. For example, when the doctor is not within the remit of the above contextual situation, the permissions will not be allowed. Such a situation may be represented as follows:

$$\text{access}(\text{PatientRecord},\text{Doctor},\{\ \})|\text{GPSLocation} \neq \text{Hospital} \lor \neg(9 \le \text{WorkingHour} \le 17) \tag{4}$$

The greatest common denominators of all the permissions assigned to different contexts may be the intersection of all the context-aware policy decisions that are applicable to given users and resources. Being able to specify the access control decision policies using contextual conditions may provide the additional accuracy and granularity in managing the access control properties.

Context-Aware Policy Administration Point (PAP) Requirements

In continuing with the above example with the doctor and patient, according to certain embodiments, the doctor may be at home and it is already after the working hours. Suddenly, the doctor may receive a call from the hospital ambulance and emergency unit that the patient has developed a serious symptom and been transferred to the emergency room. Receiving the call and knowing the situation, the doctor needs to immediately access the patient's medical records stored on the cloud server and perform necessary changes which may include, for example, updating the recent diagnosis and lab test results. Even with the cloud system satisfying the additional context-aware policy decision requirements as previously stated, he may not be able to access the files because he is outside the hospital WLAN area at any time of the day for this type of access. In other words, the context-aware policy rules as defined are now too strict for such exceptional uses.

In order to specify a change to the existing context-aware access control policy rules, additional contextual information such as location, WiFi SSID, time of the day and the device ID may have already been collected by the context sensors on the mobile device, and these can then be taken into account to define a new set of context-aware access control policy rules for the emergent or exceptional scenario. Although the doctor is not able to access the patient's medical records initially while at home, after getting the emergency call, the doctor could, according to certain embodiments, be exempted from the restriction by the system administrator because of the evidence that his device ID was already registered with the hospital system, and he could provide the authentication to prove himself as the identity he claims to be on his laptop.

In this case, the restriction of using the SSID condition is no longer needed, instead the doctor may use the current mobile 3G Internet to access those cloud files about the patient, but only through the laptop that has been registered with the hospital. With the understanding of the possible risk associated with this relaxed condition, the permission he received for modifying the patient's records is restricted to adding association between the files already in the system, rather than creating new files. Now that the doctor knows why he has been denied to access the patient's Medical Records and in what ways (e.g., switching to the registered laptop), he could be given the limited but sufficient access to get his work done. Because of the emergency, a flag may be raised so that the system administrator also finds a way to provide exemptions with additional recorded evidence. To do so, it may involve the system administrator changing the root policy according to the additional contextual parameters of the emergency situation and giving temporary access to the files, but in a more secured way.

According to certain embodiments, the requirements may be stated in the following manner. For instance, in context-aware access control policy administration requirements, given a context-aware access control policy decision requirement access(R, U, P)|C(A) as defined above, under exceptional conditions of contexts attributes $C'(A') \rightarrow C(A)$, where $C' \neq C$ and $A' \neq A$, a super-set of permissions $P' \supset P$ may be temporarily granted, denoted as:

$$\text{access}(R,U,P')|C'(A')$$

$$C'(A') \Rightarrow C(A)$$

$$P' \supset P \land C' \Rightarrow C \land A' \Rightarrow A \tag{R3}$$

In other words, the context-aware access control policy decision rule may be refined by conditions on new contextual variables. For example, while the context-aware access control decision rule $$\text{access}(\text{PatientRecords},\text{Doctor},\{\ \})|\text{GPSLocation} \neq \text{Hospital} \neg (9 \leq \text{WorkingHour} \leq 17) \quad (5)$$

denies the doctor from accessing the records, upon receipt of such complaint, a new situation may be discovered that the above rule may be relaxed to include Read permission as long as the contextual attribute DeviceID has already been registered with the hospital. Such a scenario may be shown as follows:

$$\text{access}(\text{PatientRecord},\text{Doctor},\{\text{Read}\})|(\text{GPSLocation} \neq \text{Hospital} \lor \neg (9 \leq \text{WorkingHour} \leq 17)|\land \text{IsRegistered}(\text{DeviceID})) \quad (6)$$

It may be assumed that the exceptional attributes have already been collected in the system so that the system administrator could make an informed decision and the information leading to such decisions can be audited for future investigations. Since these exceptions are often temporary in nature, it is expected that it is not necessary to refine the default policies every time. If such exceptions happen frequently, the system administrator may be entitled to refine the root policy rules to make the exceptional policy permanent.

Comparison of Policy-Based Access Control with Respect to Context-Aware PAP Requirements According to certain embodiments, a key to implement of the context-aware policy administration point requirement may be to have policies that are declarative and extensible. Such policies may take the form of rules. In terms of expressiveness, some policy-based access control frameworks such as KAoS and Rei may use an ontology to represent the semantically rich contextual information, while others such as Ponder and XACML may use simple constraints on attribute values, as shown in the comparison Table 1.

TABLE 1

Comparison of policy-based access control solutions

| Features | KAoS | Rei | Ponder | XACML |
| --- | --- | --- | --- | --- |
| Knowledge | Yes | Yes | No | No |
| Spec. language | DAML/OWL | RDF-S | Ponder | XML |
| Reasoning formalism | Theorem Prover | Prolog Engine | Event Calculus | Automated |
| Enforcement of PAP | No | No | Yes | Yes |

Knowledge representations used by KAoS and Rei may be based on ontology, while Ponder and XACML may be based on first-order logic for expressiveness. Ontology-based knowledge representation has the advantages of being able to import and compose large number of existing knowledge representations through linked data. However, security of information systems often encounters emergent properties from the contextual knowledge domains. Therefore, it may not be possible to choose knowledge representations encoded in ontology a priori to express emergent contextual situations.

The ontology-based specification languages used by KAoS and Rei are respectively DAML/OWL and RDF-S, which, in certain embodiments, may not be mandatory. Ponder and XACML are both declarative, respectively in a proprietary and an open XML standard-based specification languages. For this reason, XACML-based policies may be more amenable to extension and composition with other systems.

In terms of tool support, KAoS may have a graphical editor, KPAT, for ontology and policy management, while Rei may not yet have a GUI interface. In contrast, Ponder may have a front-end graphical editor and a back-end compiler to manipulate the policy rules. The XACMLLight tool may provide a basic text-based root policy document which can be edited by any XML-enabled tools. In addition, since the policies are stored on the server, a service-oriented query and administration of the root policy may be necessary, which makes it easier to compose with other Web services.

Underlying the tool support at the back-end, policy-based reasoning may need to be carried out using some formalism. In KAoS, a Java-based implementation of a theorem prover may be provided to facilitate the reasoning tasks. In Rei, a Prolog-based reasoning engine may be provided to perform the reasoning. Both reasoning languages are a variant of programming languages. In contrast, Ponder uses the Event Calculus and invokes SAT solvers behind the scenes, while XACML reasoning is based on rule-based engine provided by the XACMLLight implementations. Given that all of them have appropriate reasoning mechanisms, the main selection criterion is whether the formalism is easy to use and understand. Therefore, in certain embodiments, XACML is selected because it uses a family notation (XML).

Additionally, whether or not the enforcement mechanism can be composed with other software components at the server side may also be an important selection criterion. KAoS does not provide such flexibility because developers need to write the code of appropriate enforcers and insert them as entities to access control. Rei does not provide enforcement beyond what's already specified in Rei reasoning engine. Ponder provides a Java interface to the enforcement agents, whilst XACMLLight supports PDP through a policy combination algorithm in the exposed Web service operations.

The knowledge representations of KAoS and Rei may be flexibly combined with other tools because ontology may be extended with domain dependent descriptions of local entities. However, such domain dependent descriptions may not always be available a priori for the run-time contexts in which the cloud system being used. Ponder provides a management domain as a structuring technique for partitioning complex object systems, while XACML may be extended with additional knowledge structures given its extensible nature inherited from the XML standard.

Comparison of Access Control Frameworks with Respect to Context-Awareness PDP Requirements When it comes to practical access control frameworks which support parsing, interpretation, and strong typing, Ponder, X-FEDERATE, and XACML may be good candidates. Each has advantages and disadvantages, as summarized in Table 2.

TABLE 2

Comparison of practical policy-based access control solutions

| Feature | Ponder | X-FEDERATE | XACML |
| --- | --- | --- | --- |
| Policy meta-modeling | IDL | UML | XML Schema |
| Modality | Precedence | Rule Combination | Rule Combination |
| Static SoD | Meta-policies | SoD sets | No |
| Dynamic SoD | No | SoD sets | No |
| RBAC level | 1 | 3 | 1 |

TABLE 2-continued

Comparison of practical policy-based access control solutions

| Feature | Ponder | X-FEDERATE | XACML |
|---|---|---|---|
| Temporal contexts | No | periodic time logic expressions | No |
| Non-temporal contexts | parameterized constraints | | rule conditions |

Although no of existing work directly supports context-awareness for integrating mobile clients and cloud servers, some of them do provide the facility to support context-awareness. Both temporal and non-temporal contexts may be supported, for example, by the periodic time expressions for temporal contexts using X-FEDERATE. While non-temporal contexts may also be supported by all these three frameworks, XACML is relatively more flexible to integrate different schema through the name space extension of XML. Both X-FEDERATE and XACML are highly extensible, and the main difference between the two is that X-FEDERATE assumes a federated/distributed access control mechanism, while XACML does not impose any such assumptions. According to certain embodiments, the access control policy engine may be hosted on the server side, which does not necessarily need federation.

In terms of the meta-models of policies, Ponder uses an interface definition language (IDL), X-FEDERATE uses UML, and XACML does not limit the XML Schema.

According to certain embodiments, precedence relationships may be used in Ponder to resolve conflicts among the policies, while X-FEDERATE and XACML may use the rule combining models to deal with the conflicts. The static separation of duty (SoD) conflicts may be checked using meta-policies in Ponder and Separation of Duty sets in X-FEDERATE, while the dynamic SoD conflicts may be checked as well in X-FEDERATE to support the Level 3 RBAC. XACML may not check the separation of duty constraints, and it may not need to do so because they are not required by Level 1 RBAC. In contrast, XACML may not require the admin overhead of policy management, the rule conditions are sufficient to specify non-temporal contexts. The temporal contexts, however, may only be supported by the X-FEDERATE framework. In addition, given that certain embodiments propose context-aware access control solution concerns the practical approach with centralized access control decisions, XACML is found to be the suitable choice.

Design and Architecture

Figure 4:
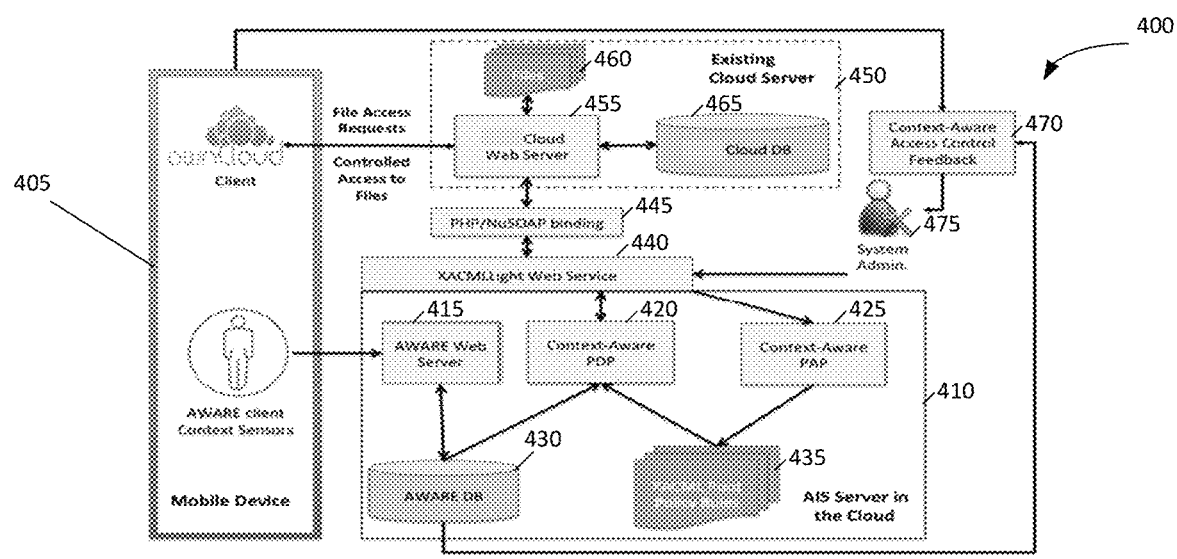
FIG. 4 illustrates an overview of an architectural design according to certain embodiments.

In order to satisfy the two key context-aware access control policy requirements, certain embodiments have extended the architecture of the cloud system to integrate an XACML policy engine and a context monitoring framework. Referring to FIG. 4, there is shown an overview of the architectural design 400 for this framework according to certain embodiments.

At the mobile device 405 on the client side, a context sensor AWARE Client is installed as a mobile library service using the client-side of the AWARE framework. Information about end-users' devices, such as time-of-uses, GPS locations, WiFi SSID's, readings of accelerometers, etc. may be collected from the contextual sensors and sent periodically to the AWARE Web server 415 of the AIS server in the cloud 410 and recorded into a relational database, AWARE DB 430. Although for a given set of context-aware policy rules only a subset of context attributes may be needed, the AWARE framework can collect as much contextual attributes as possible with the consent of users so that some of these could be used later on by the context-aware PAP.

With respect to the PDP requirements, when users browse on their mobile devices for the files listed in the cloud server, access requests to these files may be formulated and transmitted to the Cloud Web Server 455, which decides on assigning the right permissions to the users by looking up the database Cloud DB 465. The existing cloud server 455 may implement its own access control subsystem by only querying a 'PERMISSIONS' table associated with the files, which was not context-aware.

Using the AWARE framework and XACML policy engine, the context-aware access control policy decisions (PDP) may be made on relevant contextual factors together with a set of context-aware XACML root policies 435 as follows.

First, the rule conditions of the access control policies may be an abstraction of the context variables collected from the end-users into the AWARE DB 430. Second, the subjects and policy actions may be specified using the XACML syntax and updated by the system administrator through the Context-Aware PAP 425 operations of XACMLLight Web Service 440. The files 460 of similar access control properties may be aggregated using the existing cloud PERMISSIONS table and the new context-aware framework may generate additional contextual parameters, via the NuSOAP bindings to the PHP programs 445 in the cloud server 455, as part of the requests to Context-Aware PDP 420 operations of the XACMLLight Web Service 440. Such policy decisions may mix the context-aware access control policies with the context-of-uses of the files 460 upon request, which facilitate both flexible and efficient computation of access control decisions.

If users are not satisfied with the access control decisions, their feedback on context-aware access control policies 470, together with the related contextual information from the AWARE DB 430, may be sent to the system administrator 475 in order to consider updating the XACML root policy rules that implement the context-aware PAP requirements. Both the cloud server 455 and AWARE Web servers 415 may be implemented on top of Apache Web servers, and the XACMLLight Web service 440 is implemented on top of Apache Axis2 framework.

Implementation and Evaluation

Interfacing Cloud Server with PAP and PDP in XACML-Light Web Services

According to certain embodiments, a cloud-based server has been implemented in PHP, a popular programming language for designing Web applications, while XACML is a Web-service based standard which has a reference implementation called XACMLLight. Even though the underlying programming language for XACMLLight is Java, it was thought to be straightforward to integrate them because Web services provide programming language agnostic interoperability between heterogeneous functions as long as they are compliant to the standard interfaces such as WSDL and messaging formats such as SOAP.

Referring to FIG. 5, there is shown an example policy in XML, which expresses a doctor requesting read access to the patient's record according to certain embodiments. As shown in FIG. 5, the doctor is represented as "Doctor Bob" and the patient is referenced as "Alice". Here, the access control policy variables for subject and resources (e.g., "Doctor=Bob" and "PatientRecord=Alice") are obtained from the cloud-based systems directly.

Referring to FIG. 6, there is shown an example policy of the root policy rule in XACML according to certain embodiments, which defines the permissions for Bob the Doctor to have the READ access Patient's Record of Alice only when both of the two Boolean conditions "isGPSWithinHospital" and "isWorkingHour" are true.

The policy of FIG. 6 instantiates the context-aware PDP requirement in (5) by evaluating the condition as two sub-conditions: "isGPSWithinHospital" as Latitude $\in$ (25.287−0.005, 25.2867+0.005), Longitude $\in$ (51.53-0.005, 51.53+0.005) (according to Doha Hospital's GPS location) and "isWorkingHour" as "WorkingHour $\in$ [9, 17]". Both sub-conditions evaluated to false for the example request, therefore, the decision response is "Deny" in this example. Referring to FIG. 7, there is shown an example policy of the denial of the decision response in view of the policy of FIG. 6.

However, a question may arise of how it may be possible to know from the cloud-based server's XACMLLight request, the concrete GPS locations and working hours if they were not collected by the original cloud-based system. The contextual variables "Latitude=52.04", "Longitude=0.76'", "WorkingHour=20" may only be obtained from the AWARE DB 430, not from the cloud server 455, and their implementation are integrated with XACMLLight by modifying the implementation of the class PDPImpl java to read the specification of context-aware conditions denoted by the additional attribute origin="Aware" we introduced to the "EnvironmentAttributeDesig-nator" elements.

In addition to this extension to the XACML schema, according to certain embodiments, also introduced was a separate declaration for the context-aware conditions, by reusing the XACML schema for "Condition". With reference to FIG. 8, there is shown an example policy for specifying conditions of the "isGPSWithinHospital" and "isWork-ingHour".

As can be seen, the XML-based request-response pair shown in FIG. 8 requires the SOAP XML messages to be generated or parsed automatically. However, such integration can be more complex. First of all, the PHP web services may require an additional layer to arbitrate how the data structures in PHP are mapped to the SOAP messages. For this purpose, according to certain embodiments, NuSOAP may be selected, which offers the basic means to package PHP parameters into SOAP arguments for Web services. To integrate request/response SOAP messages to and from the XACMLLight web services, the NuSOAP PHP bindings may be used. The default implementation of NuSOAP may produce a SOAP envelope wrapper in XML format of a simple PHP data structure. However, XACML Web services requests may include complicated data structures, which involve nested maps with predefined key names. According to certain embodiments, in order to build such complicated SOAP messages automatically without changing the WSDL interface, changes in nusoap.php binding file were made to produce the required SOAP messages from any native PHP data structures.

Secondly, according to certain embodiments, XACML-Light may be reconfigured for the underlying Axis2 server to provide it as a Web service. The default configurations in the documentation of XACMLLight on Axis server may not be sufficient for this purpose. In certain embodiments, changes may be made to the useOriginalWSDL variable from true to false in the META INF/services.xml file inside the authz.aar archive located at the axis2-1.6.2/repository/services folder. In certain embodiments, to change this parameter value, one needs to first extract the authz.aar and change the value in both places (i.e., respectively for both PDPService and PAPService) where the variable is used, then repackage it to replace the original authz.aar in place.

To implement PDP, the other side of the binding between the cloud-based server and XACMLLight is to insert additional instructions to invoke cloud/apps/files/index.php when a file is accessed, which generate the SOAP message required by the WSDL operations of the XACMLLight Web service. In this way, the parameters may be created directly from the control variables such as the subject user, in order to form the request SOAP message. The message may then be evaluated by the PDP operations of XACMLLight policy engine, and the response from the PDP operations of policy engine may also be fetched from the message, returned to the control of the modified cloud program as native PHP variables via NuSOAP bindings.

In certain embodiments, after the above changes, the PDP parameters may still be static, which need to be connected to the context monitor in order to satisfy the context-aware PDP requirements. For example, the AWARE DB 430 contextual data may be fetched from the database as queries implemented by the modified XACMLLight so that the context variables referenced by the rule conditions in XACML policies can be evaluated at run-time. Due to the separation of concerns of Web services, such implementation may be isolated from the service interfaces. Therefore, the modified cloud system may not need to know exactly how the computation was done. It would allow future integration of the context-aware self-adaptive access control with other legacy software systems.

Similar to the above changes to the PDP operations, in other embodiments, PAP operations of XACMLLight were wrapped so that they can be used to reconfigure the root policy of XACMLLight by the system administrators. When a user sees the denial of a certain access request to a file, on the cloud-based server Web interface, "Info" button may be added to explain the decisions made by the system. As a side effect of such explanation, the contextual information of the AWARE DB 430 in relation to the access decision may notify the system administrator at the back-end. On reflection of the frequent complaints from users, the system administrator may specify the root access control policy rules differently and create a PAP request to the XACML-Light Web service to update the XACML root policy rules. The administrators may be trusted to make the right changes to the policies. At the same time, all the changes made by the system administrator may be logged, along with the logs of the contextual information in relation to users' requests for future auditing purposes.

Setting Up Context-Aware Server through Web Services and AWARE Mobile Clients

Next, details of how to make the modified cloud Web server aware of the mobile contexts of individual users through the AWARE framework is provided, and how to further connect the data through the modified XACMLLight Web service.

Because the AWARE framework uses a relational database on the server side, in certain embodiments, the RDB configurations may first be set up. The cloud-based server may use databases internally. Thus, according to certain embodiments, the same database management system may be shared to simplify the solution. In other embodiments, the business logic may be separated from access control data, therefore the two databases may be stored separately using different docker sub-containers to avoid tainting each other in a multi-tenant cloud environment.

Database Setup Using Docker Containers

According to certain embodiments, an empty database (e.g., MYDATABASE) may be created on a MySQL server, and assign it a user MYDATABASEUSER and password MYDATABASEPASS-WORD. The first time an AWARE Client connects to the server, the database may automatically be created. This is where the data collected on the mobile phone may be replicated. Because of the docker container, it is possible to make sure that the same database management system (e.g., MySQL) is storing the data on different volumes on the server.

Server Dashboard

Figure 9:
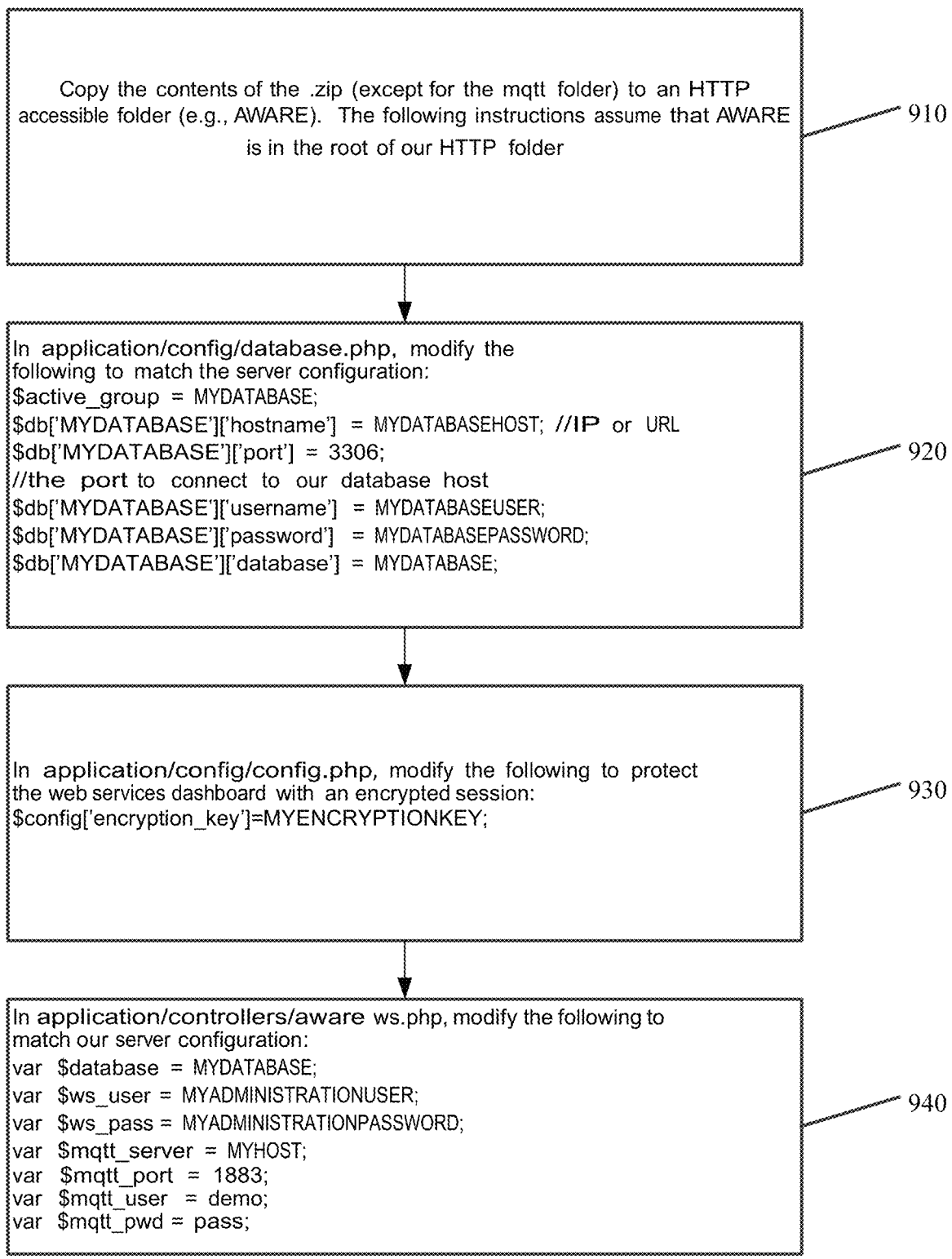
FIG. 9 illustrates a method according to certain embodiments.

According to certain embodiments, the AWARE Server Dashboard may allow one to remotely manage an experiment, or request the data to be sent to a cloud server. Using the MQTT protocol, it may be possible to extend the supported commands to particular needs. Referring to FIG. 9, there is shown a method of setting up an AWARE Server dashboard according to certain embodiments. In the exemplary method of FIG. 9, suppose YOURHOST is the server domain or IP address.

As shown in FIG. 9, at step 910, the contents of the .zip is copied, and the instructions assume that AWARE is in the root of the HTTP folder of the cloud server. At step 920, the php database file is modified to match the server configuration. Further, at step 930, the config php file is modified to protect the web services dashboard with an encrypted session. At step 940, the aware_ws php file is modified to match the cloud server configuration.

The status of the web-service may be checked at http://OURHOST/AWARE/index.php, and the following URL displays the AWARE Server Dashboard: http://ais.qu.edu.qa/AWARE/index.php/aware ws/dashboard.

According to certain embodiments, the dashboard may ask one to authenticate, which can be provided as MYADMINISTRATIONUSER.

Setting up AWARE Client to use the AWARE Server According to Certain Embodiments Once the AWARE Server is setup (web service), one can add server details in the AWARE Client application by connecting the mobile device to the internet (network data plan or WiFi).

Configuring the Web Server on the Client

Once connected, one can open the AWARE Client application on the mobile device, and activate the 'AWARE Server Web-services' by setting it to http://YOURHOST/AWARE/index.php/aware_ws/index.

Figure 10:
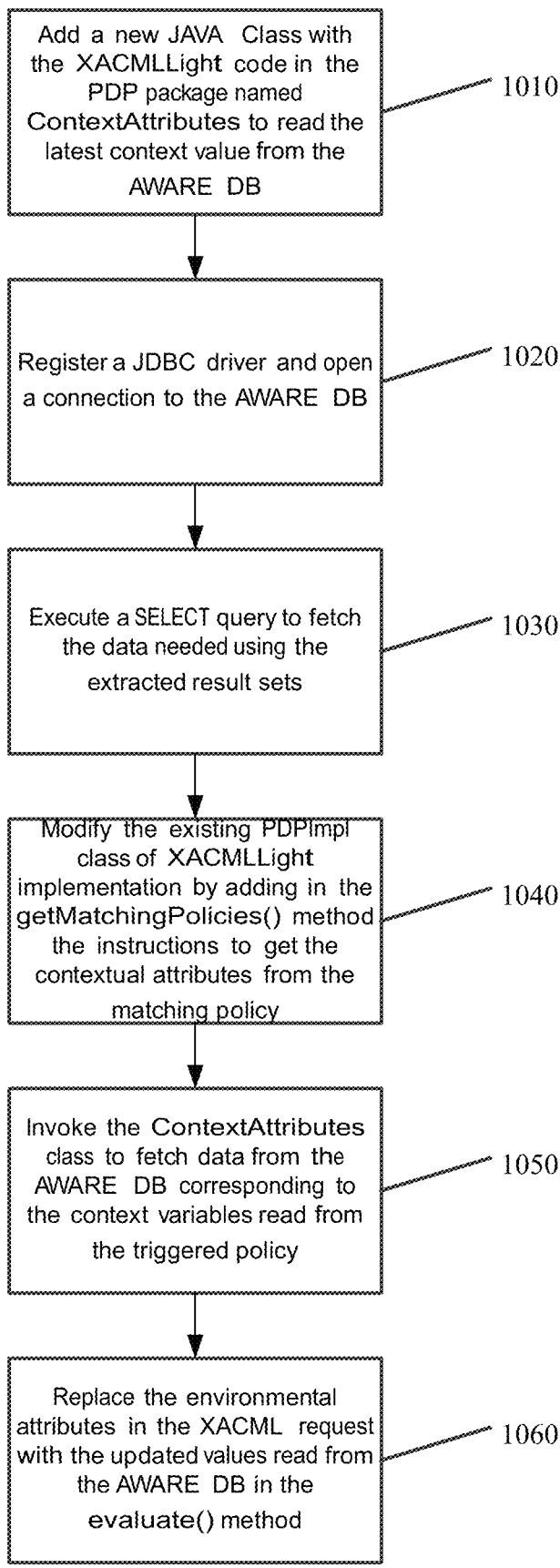
FIG. 10 illustrates another method according to certain embodiments.
Figure 11:
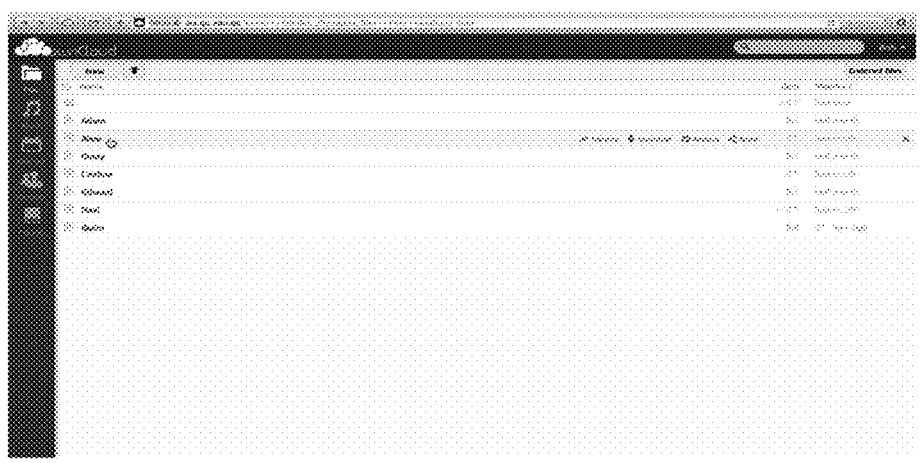
FIG. 11 illustrates a cloud-based server in use according to certain embodiments.
Figure 12:
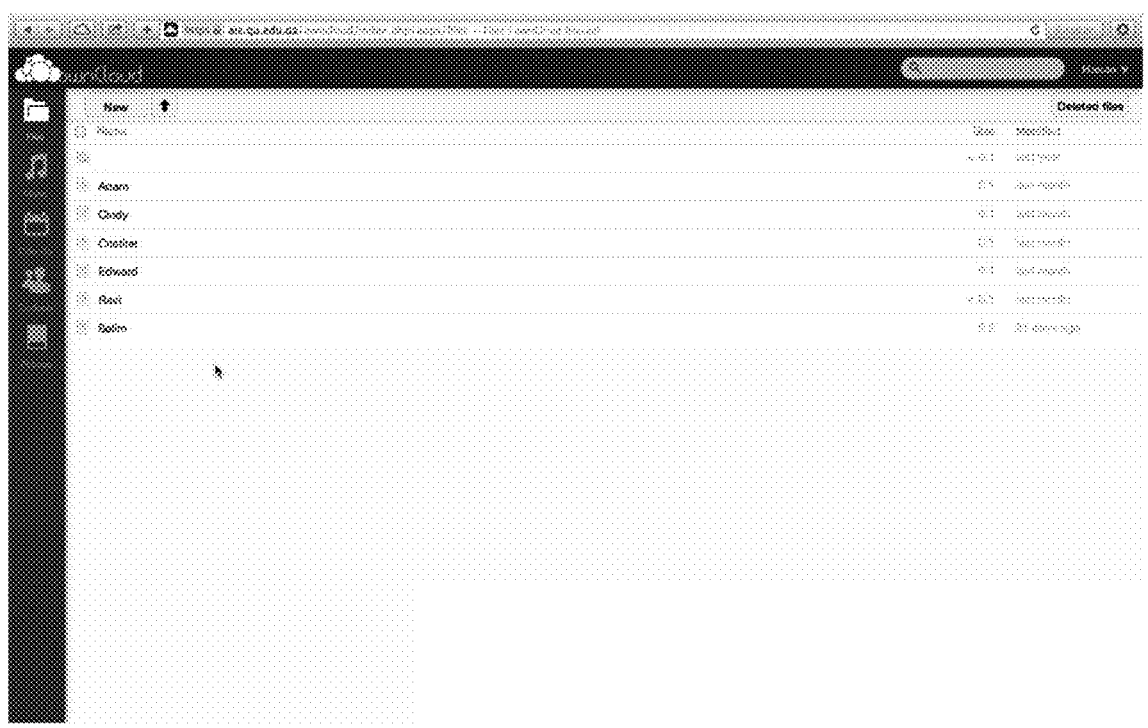
FIG. 12 illustrates another cloud-based server in use according to certain embodiments.
Figure 13:
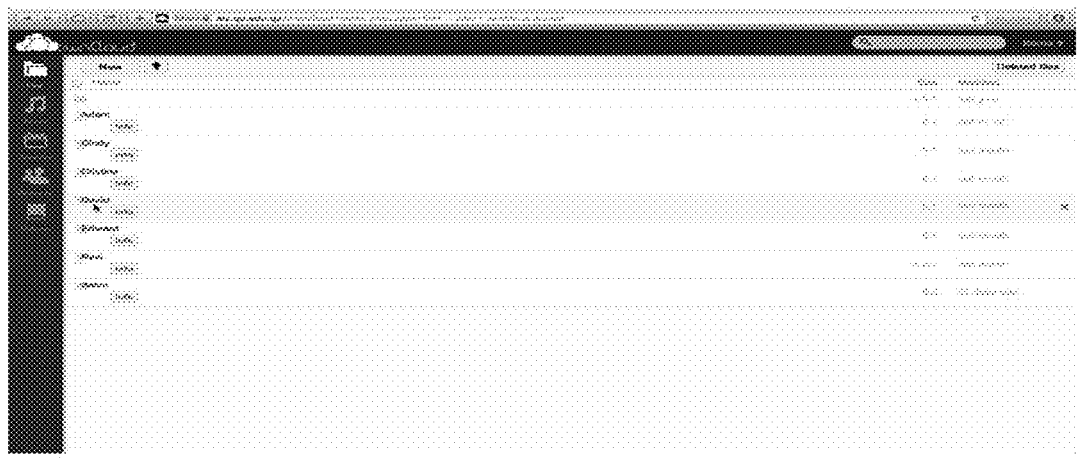
FIG. 13 illustrates a further cloud-based server in use according to certain embodiments.

Once activated, the client may start pushing data to the MySQL database on the server using the above service. With reference to FIG. 10, there is shown a method according to certain embodiments, for connecting XACMLLight Web service with the AWARE Web server. In step 1010, a new JAVA Class with XACMLLight code in the PDP package named ContextAttributes is added to read the latest context value from the AWARE DB 430. At step 2, a JDBC driver is registered and a connection to the AWARE DB 430 is opened. At step 1030, a SELECT query is executed to fetch the data needed using the extracted result sets. At step 1040, the existing PDPIMpl class of XACMLLight implementation is modified by adding in the getMatchingPolicies( )method the instructions to get the contextual attributes from the matching policy. At step 1050, ContextAttributes class is invoked to fetch data from the AWARE DB 430 corresponding to the context variables read from the triggered policy. At step 1060, the environmental attributes in the XACML request is replaced with the updated values read from the AWARE DB 430 in the evaluate( )method.

The Interaction of the "Info" Button on the Cloud-Based Server

In the implementation, the decision log may be stored in the modified cloud-based server database for each request made to the XACMLLight policy engine. On the Web interface of the original cloud-based server, files may be shown as a list to users with permission to access them. Along with each file is a hyperlink to open the content and a few buttons on the hover menu to perform additional actions such as Rename, Download, Share, etc. Therefore, these capabilities may form the original cloud-based server must be kept if the decision from the XACML Policy engine is "Permit". However, if the decision is "Deny", the hyper link and those hover buttons will not be shown. Instead, an "Info" button may be placed next to the file item for user to know an explanation why the access was denied on this file. Furthermore, the policy administration may receive from the AWARE DB 430 rows of context logs within 5 minutes of the time when user received the "Deny" decision, only if the user has clicked the "Info" button. These roles, together with the rules that deny the access, will be presented to the system administrator as feedback to help change to the policy accordingly.

According to certain embodiments, in the Permissions.php program of the cloud-based server, while the request is made to access the file, the XACMLLight policy engine may be invoked, which may read the context from the modified PDPImpl.java library program in XACMLLight to determine which policy rule needs to be applied for the request arrived. According to the matching policy among the root policy rules, the modified XACMLLight may return the access control decision back to the permission.php program in the cloud-based server. At this point, the log has been stored with an auto assigned request number, the policy rule applied, the decision made, the contexts read, etc. Therefore, if there is a deny decision made according to the policy rule, the partlist.php program of the cloud-based server will generate a list of files that do not have the Permit decision, without showing any link to open and any button of permitted actions.

The "Info" button may also enable users to find out which policy rule was used according to which context, when a deny decision was made. If the user wants to have an emergent, temporary, but secure access of the file, s/he could proceed from that point and raising the emergency flag, given that necessary authentications have been granted. After the system administrator reacted to complaint request by updating the policy rule using the PAP operations of XACMLLight Web service, the user may be provided with temporary access permissions to requested file.

In certain embodiments, existing XACMLLight PDP may receive a request file that contains a subject, an object, an action and several contextual attributes. According to those values, PDP may choose the right rule to apply from the root policy. When the request was generated automatically as the user tries to access the files, not all values of these contextual attributes and their relevance may be fully known at the decision time. Therefore, in certain embodiments, a decision has to wait for collecting all these values, which might slow down the process.

To be more efficient, according to certain embodiments, the existing may be modified to read the request subject, object and action values and match them with the root policy to determine which rule would be applied to address this particular request. Then from that particular rule, only those relevant contextual attributes would need to be evaluated. Binding these values with the existing request file, the modified PDP may use all the root policy rules together to obtain the access control decision, which could save resource, time and process by reading only those required and current values. The modified implementation added a new class ContextAttributes java into the PDP package of existing XACMLLight, which reads and returns required attribute values to the class PDPImpl java to determine the access control decision.

Figure 14:
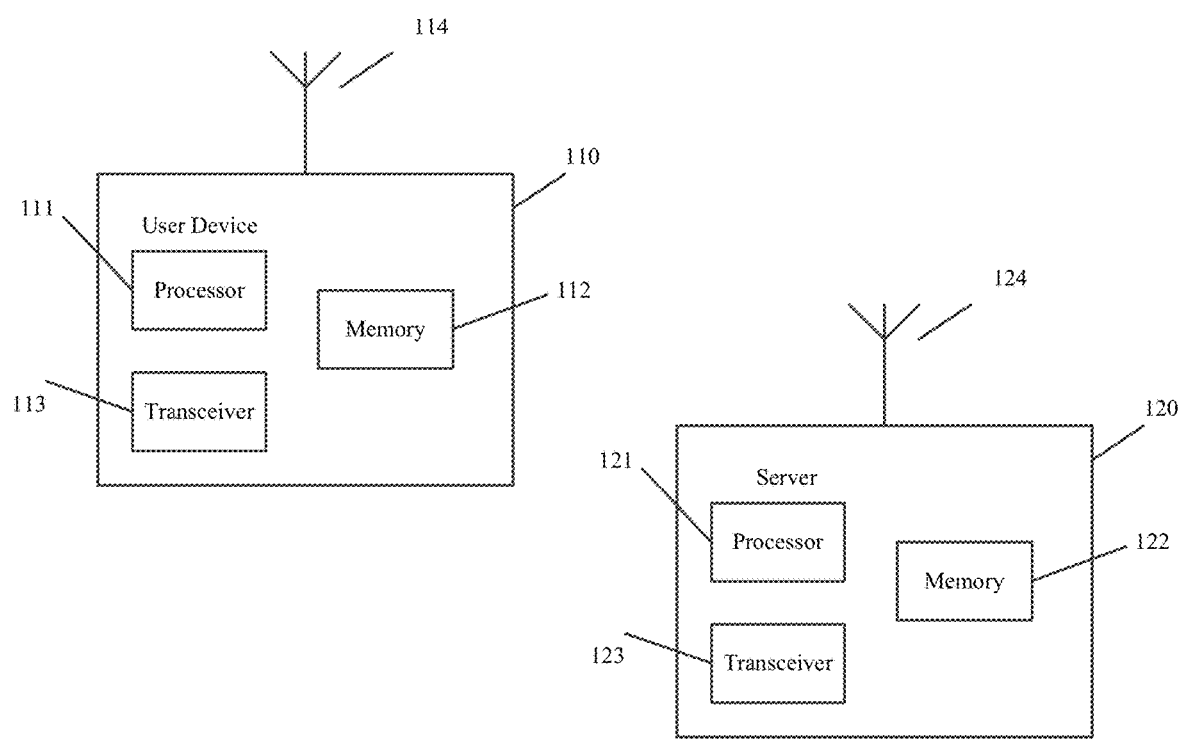
FIG. 14 illustrates a system according to certain embodiments.

Referring to FIG. 14, there is shown a system according to certain embodiments. It should be understood that each of FIGS. 1 through 13 may be implemented by various means of their combinations, such as hardware, software, firmware, one or more processors and/or circuitry. In one embodiment, a system may include several devices, such as, for example, user device 110, or server 120. The system may include more than one device 110, and server 120, although only one of each of these devices is shown in FIG. 14 for the purposes of illustration.

Each of the devices shown in FIG. 14 may include at least one processor or control unit or module, respectively indicated as 111, and 121. At least one memory may be provided in each device, and indicated as 112, and 122, respectively. The memory may include computer program instructions or computer code contained therein. One or more transceiver 113 and 123 may be provided, and each device may also include an antenna, respectively illustrated as 114 and 124. Although only one antenna each is shown, many antennas and multiple antenna elements may be provided to each of the devices. Other configurations of these devices, for example, may be provided. Other configurations of these devices, for example, may be provided. In certain embodiments, the user device 110 may be a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the server 120 may be a cloud server, system server, or any other similar type devices.

Transceivers 113 and 123 may each, independently, be a transmitter, a receiver, or both a transmitter and a receiver, or a unit or device that may be configured both for transmission and reception. In other embodiments, the user device or server may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One or more functionalities may also be implemented as virtual application(s) in software that can run on a server.

Processors 111, and 121 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 112, and 122 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user device 110, or server 120, to perform any of the processes described above, including, for example, at least those shown in FIGS. 1-13 and 15. Therefore, in certain embodiments, a non-transitory computer-readable medium may be encoded with computer instructions or one or more computer program (such as added or updated software routine, applet or macro) that, when executed in hardware, may perform a process such as any one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Figure 15:
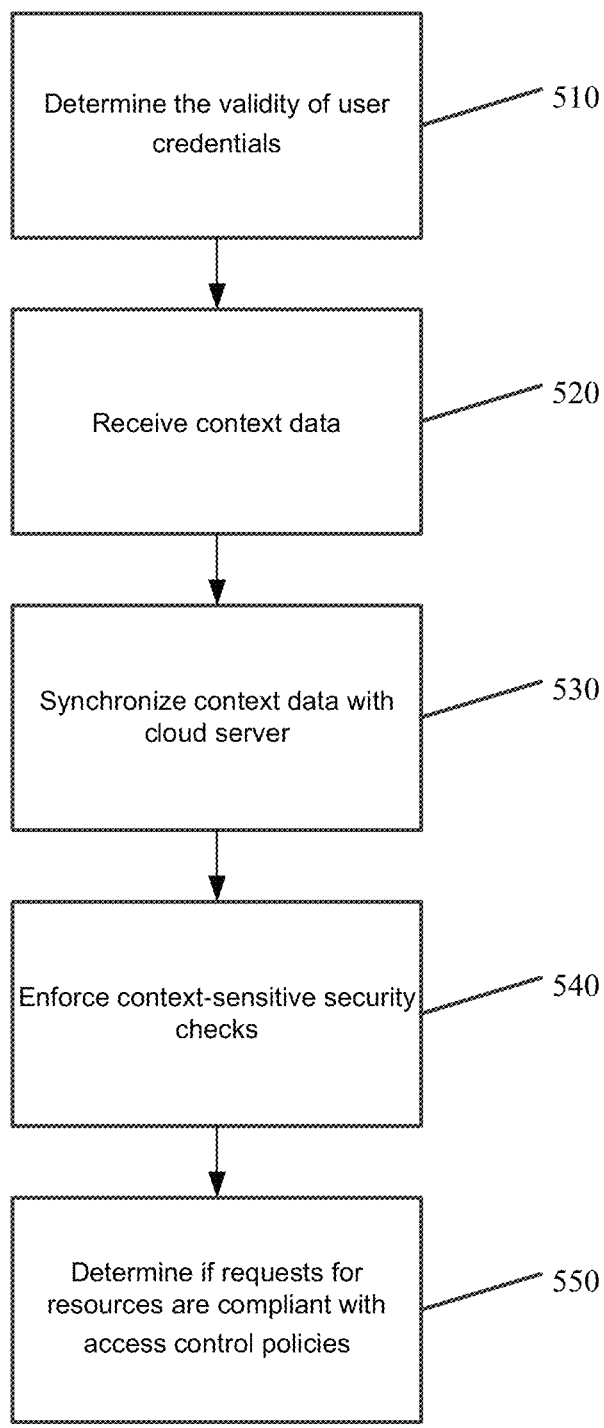
FIG. 15 illustrates another method according to certain embodiments.

FIG. 15 illustrates another method according to certain embodiments. The method illustrated in FIG. 15 includes, at 510, determining, at a cloud server, the validity of user credentials received from a user device. The method can also include, at 520, receiving context data related to the user device based on the validity of the user credentials. In addition, the method may include, at 530, synchronizing the context data with the cloud server. Further, the method may include, at 540, enforcing context-sensitive security checks on requests made by the user for resources based on the sensor data collected by the user device. In addition, at 550, the method may include determining if the requests for resources are compliant with access control policies of the cloud server in addition to enforcing the context-sensitive security checks.

Certain embodiments may be directly applicable in cloud-based software systems that adapt their security mechanisms in response to contextual changes in the environment of the users. For instance, certain embodiments may be used in the development method of cloud-based file sharing applications. Other applications of certain embodiments may include, for example, in existing cloud-based file storage applications, creating a plug-in in order to support security needs of individual users or to support organizational security policies amongst a set of users. Such a plug-in may be offered by the owners of the cloud-based file storage application services themselves, or by a third-party vendor as an additional application, or by organizations that use the cloud-based file storage application to manage file-sharing tasks.

A further application of certain embodiments may include a new cloud-based file storage application that may offer adaptive security as a built-in feature, either when competing directly with existing services, or when differentiating from the existing services. Further, other embodiments may be applicable to any cloud-based system where security mechanisms are implemented as a rule-based access control system that needs to take into account the contextual factors.

Additionally, certain embodiments may provide distinct advantages. For example, according to certain embodiments, it is possible to provide an AIS architecture that provides security checks in addition to security policies, and work with both existing as well as new cloud-based web applications. According to other embodiments, neither the client-side software, nor the server-side software needs modification. The context sensing by the In Monitor and Out Monitor may run in parallel to the client-side software. Similarly the Adaptation Engine may run as a wrapper to the access control engine on the server side. Such features may make the method and system of certain embodiments generic and applicable to a range of software systems.

According to other embodiments, it may be possible for the Adaptation Engine to be designed in a way that it performs additional checks for security, rather than remove the checks by the policy engine. In other words, adaption may ensure a higher degree of security. Additionally, in further embodiments, it may be possible for the In Monitor, Out Monitor, and Adaptation Engine to be generic and be implemented in a number of ways. That is, it may be possible for the user to choose to implement their own tools or use third-party tools for this.

According to certain embodiments, it is possible to define the context-aware access control policy decision and administration requirements that were not supported by the vanilla cloud-based server software solution. In certain embodiments, is possible to achieve enhanced availability for the cloud-based storage service by: (a) re-engineering the cloud-based server with the standard-compliant attribute-based access control XACMLLight library, and the mobile client of the AWARE framework for collecting contextual attributes; and (b) extending XACML to declare context-aware conditions for interpreting contextual variables for the XACML root policy rules. As part of this process, the design rationale and implementation considerations in the entire solution were discussed. After evaluating the solution with a controlled experiment, it is possible to demonstrate the advantage of satisfying the context-aware access control requirements.

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

According to a first embodiment, a method of controlling access to data held in the cloud may include monitoring user context by collecting sensor data relating to a user device operated by a user. The method may also include synchronizing the collected sensor data to a cloud server. The method may further include enforcing context-sensitive security checks on requests made by the user for resources based on the collected sensor data.

We claim:

1. A method for controlling access to data held in the cloud, comprising:
   determining, at a cloud server, the validity of user credentials received from a user device;
   receiving context data related to the user device based on the validity of the user credentials;
   synchronizing the context data with the cloud server; and
   enforcing context-sensitive security checks on requests made by a user for resources based on sensor data collected by the user device,
   wherein the context data comprises data about a state of a physical world outside of the user device,
   wherein the context data comprises data about a state of the user device itself,
   wherein the context data about the state of the physical world outside of the user device comprises a user identity, a global positioning system location of the user device, and an accelerometer reading, and
   wherein the context data about the state of the user device itself comprises applications running on the user device at a given time, a battery level of the user device, and screen brightness of the user device.

2. The method for controlling access to data held in the cloud according to claim 1, wherein access to the resources is subject to one or more preconditions related to the context data.

3. The method for controlling access to data held in the cloud according to claim 1, further comprising determining if the requests for resources are compliant with access control policies of the cloud server in addition to enforcing the context-sensitive security checks.

4. The method for controlling access to data held in the cloud according to claim 1, wherein the context-sensitive security checks varies based on a sensitivity level of the resources.

5. A cloud server that for controlling access to data held in the cloud, comprising:
   at least one processor; and
   at least one memory including computer program code,
   wherein the at least one memory and the computer program code are configured to, with the at least one processor, cause the apparatus at least to
   determine the validity of user credentials received from a user device;
   receive context data related to the user device based on the validity of the user credentials;
   synchronize the context data with the cloud server; and
   enforce context-sensitive security checks on requests made by a user for resources based on sensor data collected by the user device,
   wherein the context data comprises data about a state of a physical world outside of the user device,
   wherein the context data comprises data about a state of the user device itself,
   wherein the context data about the state of the physical world outside of the user device comprises a user identity, a global positioning system location of the user device, and an accelerometer reading, and
   wherein the context data about the state of the user device itself comprises applications running on the user device at a given time, a battery level of the user device, and screen brightness of the user device.

6. The cloud server according to claim 5, wherein access to the resources is subject to one or more preconditions related to the context data.

7. The cloud server according to claim 5, wherein the at least one memory and the computer program code are further be configured to, with the at least one processor, cause the apparatus at least to determine if the requests for resources are compliant with access control policies of the cloud server in addition to enforcing the context-sensitive security checks.

8. The cloud server according to claim 5, wherein the context-sensitive security checks varies based on a sensitivity level of the resources.

9. A computer program, embodied on a non-transitory computer readable medium, the computer program, when executed by a processor, causes the processor to:
- determine, at a cloud server, the validity of user credentials received from a user device;
- receive context data related to the user device based on the validity of the user credentials;
- synchronize the context data with the cloud server; and
- enforce context-sensitive security checks on requests made by a user for resources based on sensor data collected by the user device,
- wherein the context data comprises data about a state of a physical world outside of the user device,
- wherein the context data comprises data about a state of the user device itself,
- wherein the context data about the state of the physical world outside of the user device comprises a user identity, a global positioning system location of the user device, and an accelerometer reading, and
- wherein the context data about the state of the user device itself comprises applications running on the user device at a given time, a battery level of the user device, and screen brightness of the user device.

10. The computer program according to claim 9, wherein access to the resources is subject to one or more preconditions related to the context data.

11. The computer program according to claim 9, wherein the computer program, when executed by the processor, further causes the processor to determine if the requests for resources are compliant with access control policies of the cloud server in addition to enforcing the context-sensitive security checks.

12. The computer program according to claim 9, wherein the context-sensitive security checks varies based on a sensitivity level of the resources.

* * * * *